US008232334B2

(12) United States Patent
Kelly et al.

(10) Patent No.: US 8,232,334 B2
(45) Date of Patent: Jul. 31, 2012

(54) POLYMER MODIFIED CARBOHYDRATE CURABLE BINDER COMPOSITION

(75) Inventors: Michael DeWayne Kelly, North Wales, PA (US); Haksu Lee, Ambler, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 332 days.

(21) Appl. No.: 12/660,373

(22) Filed: Feb. 25, 2010

(65) Prior Publication Data

US 2010/0222459 A1 Sep. 2, 2010

Related U.S. Application Data

(60) Provisional application No. 61/208,733, filed on Feb. 27, 2009.

(51) Int. Cl.
*C08L 97/02* (2006.01)
*C08F 251/00* (2006.01)

(52) U.S. Cl. .......................................... 524/14; 527/312

(58) Field of Classification Search .................... 524/14; 527/312

See application file for complete search history.

(56) References Cited

U.S. PATENT DOCUMENTS

| | | | | |
|---|---|---|---|---|
| 2,215,825 | A | 9/1940 | Wallace et al. | |
| 3,274,012 | A | 9/1966 | Cooper et al. | |
| 3,513,001 | A | 5/1970 | Worthington et al. | |
| 4,107,379 | A | 8/1978 | Stofko | |
| 4,183,997 | A | 1/1980 | Stofko | |
| 4,524,164 | A | 6/1985 | Viswanathan | |
| 5,371,194 | A | 12/1994 | Ferretti | |
| 5,661,213 | A | 8/1997 | Arkens | |
| 5,895,804 | A | 4/1999 | Lee et al. | |
| 5,905,115 | A | 5/1999 | Luitjes et al. | |
| 6,136,916 | A * | 10/2000 | Arkens et al. | 524/556 |
| 6,262,159 | B1 | 7/2001 | Dreher et al. | |
| 6,299,936 | B1 | 10/2001 | Reck et al. | |
| 6,753,361 | B2 | 6/2004 | Kroner et al. | |
| 7,026,390 | B2 | 4/2006 | O'Brien-Bernini et al. | |
| 7,195,792 | B2 | 3/2007 | Boston et al. | |
| 7,199,179 | B2 | 4/2007 | Clamen et al. | |
| 7,579,289 | B2 | 8/2009 | Clamen et al. | |
| 7,655,711 | B2 * | 2/2010 | Swift et al. | 524/14 |
| 7,766,975 | B2 | 8/2010 | Clamen et al. | |
| 7,829,611 | B2 * | 11/2010 | Kelly | 524/17 |
| 7,893,154 | B2 | 2/2011 | Van Herwijnen et al. | |
| 2005/0215153 | A1 * | 9/2005 | Cossement et al. | 442/180 |
| 2006/0239889 | A1 | 10/2006 | Lewis et al. | |
| 2007/0123679 | A1 | 5/2007 | Swift et al. | |
| 2007/0123680 | A1 | 5/2007 | Swift et al. | |
| 2008/0051539 | A1 | 2/2008 | Kelly | |
| 2008/0191179 | A1 | 8/2008 | Bernard et al. | |
| 2009/0170978 | A1 | 7/2009 | Kelly | |
| 2009/0324915 | A1 * | 12/2009 | Swift et al. | 428/219 |
| 2010/0087571 | A1 | 4/2010 | Jackson et al. | |
| 2010/0282996 | A1 | 11/2010 | Jaffrennou et al. | |
| 2011/0039111 | A1 | 2/2011 | Shooshtari | |
| 2011/0040010 | A1 | 2/2011 | Shooshtari | |
| 2011/0210280 | A1 | 9/2011 | Jaffrennou | |

FOREIGN PATENT DOCUMENTS

| | | | |
|---|---|---|---|
| DE | 1905054 | | 8/1969 |
| EP | 0020004 | A1 | 12/1980 |
| EP | 0 044 614 | A2 | 1/1982 |
| GB | 2 078 805 | A | 1/1982 |
| JP | 49071121 | A | 7/1974 |
| WO | WO 2007/014236 | A2 | 2/2007 |
| WO | WO 2008/091256 | A1 | 7/2008 |
| WO | WO 2009/004261 | A2 | 1/2009 |
| WO | WO 2009/006532 | | 1/2009 |
| WO | WO 2009/019232 | A1 | 2/2009 |
| WO | WO 2009/019235 | A1 | 2/2009 |
| WO | 2009149334 | A2 | 12/2009 |
| WO | 2011019597 | A1 | 2/2011 |
| WO | 2011019598 | A1 | 2/2011 |
| WO | 2011044490 | A1 | 4/2011 |

OTHER PUBLICATIONS

Micheel et al., "D-Glucose Derivatives of Proteins," Chemical Abstracts, vol. 51, No. 4, Feb. 1, 1957, pp. 1-2.

* cited by examiner

*Primary Examiner* — Satya Sastri

(74) *Attorney, Agent, or Firm* — Andrew E. C. Merriam

(57) ABSTRACT

A curable aqueous binder composition comprising one or more amine reactant selected from the group consisting of: a protein, a peptide, an amino acid, an ammonium salt of a polycarboxylic acid, an ammonium salt of a (poly)hydroxy-(poly)carboxylic acid; one or more carbohydrate; and one or more emulsion polymer; and the use thereof as thermosetting binders. Also described are composite materials comprising the curable binder composition, and methods of application.

10 Claims, No Drawings

POLYMER MODIFIED CARBOHYDRATE CURABLE BINDER COMPOSITION

This application claims the benefit of priority under 35 U.S.C. 119 (e) of U.S. Provisional Patent Application Ser. No. 61/208,733 filed on Feb. 27, 2009.

The present invention relates to a carbohydrate curable composition useful as a thermosetting binder for a variety of applications. More particularly, the present invention relates to aqueous binder compositions comprising one or more amine reactant selected from the group consisting of: a protein, a peptide, an amino acid, an ammonium salt of a polycarboxylic acid; one or more carbohydrate; and one or more emulsion polymer; and the use thereof as curable binders.

Due to their favorable cost/performance ratio, the thermosetting binder resins of choice in the past have been phenol/formaldehyde or urea/formaldehyde resins. However, curable compositions containing little or no formaldehyde are now highly desirable in a variety of products, due to the health and environmental problems associated with formaldehyde. Applications for formaldehyde resins are extensive and include fiber bonding, composites, and fibers. These fibers may be cellulosic, polymeric such as polyester, or mineral fibers. The mineral fibers may consist of molten glass, slag or stonewool. Typically these fibers are blown into a forming chamber, sprayed with a binder, and deposited as a web on to a conveyer. The coated mineral fibers are drawn into a curing oven and shaped into various building and insulation products. In the case of insulation products, cured mineral fiber binders allow the insulation to be compressed, but have rigidity that allows the compressed insulation to recover substantially to its original shape once compressive forces are removed. This allows, for example, the insulation to be shipped in a rolled, compressed state and unrolled before installation to release the compression, and allow a fluffy, heat-insulating mat to be installed.

Rigid binders may find use, for example, in mineral wool applications such as fiberglass and stonewool insulation, and acoustic panels. For other applications, such as where rigid binders are unsuitable, for example, in thin fiberglass or polyester mats that are to be used in roofing, the mat is held together with a binder that allows the mat to flex substantially after the binder is cured, to allow the mat to be processed further (e.g., to convert mat into roofing material), and allow the end product containing the mat to flex well in use. For example, in roofing mat, the end roofing product may be impregnated or layered with asphaltic materials, and the resultant roofing product retains flexibility to allow it to conform to the roof (e.g., bend over peaks and into valleys), and to allow the roofing material to expand and contract with temperature fluctuations, without the mat itself fracturing because it is too brittle and lacks flexibility. Other applications where curable, formaldehyde-free binders that are "flexible" are useful in this regard include paper, cellulosics, polyester, glass mat, and glass veil. Such substrates are used in a variety of applications, including flooring underlayments, filtration media, and building products.

Existing commercial aqueous formaldehyde-free binder compositions most commonly comprise a soluble polycarboxylic acid polymer and a polyol that esterify and form a thermoset when heat cured. However, given that soluble polymers have a relatively high acid monomer content, binders and composite materials derived from these binder compositions tend to be stiff and unsuitable for flexible substrates. Moreover, these binders are known to be derived primarily from petroleum feed stocks which are dwindling and experiencing wide price fluctuations. Formaldehyde-free binders derived from alternative feed-stocks are desired.

One alternative to petroleum is described in International Patent Publication No. WO 2007/014236, which discloses binders to produce or promote cohesion in non or loosely assembled matter, which binder compositions comprise an amine component, which is either a protein, a peptide, an amino acid, or an ammonium salt of a polycarboxylic reactant in combination with a reducing sugar or non-carbohydrate carbonyl component, and which binder is thought to cure by way of a Maillard reaction. However, these binder compositions are also stiff and unsuitable for flexible substrates, and, additionally, fail to develop sufficient strength for most applications.

There remains a need for an inexpensive, formaldehyde-free, thermoset binder from renewable materials that provides both flexibility and strength to the end product. To solve the problem of providing renewable source thermosetting binders with both strength and flexibility, the present inventors have sought to provide a formaldehyde free binder of the present invention.

STATEMENT OF THE INVENTION

The present invention provides aqueous compositions which may function as binders comprising one or more amine component chosen from a protein, a peptide, an amino acid, an ammonium salt of a polycarboxylic acid, an ammonium salt of a (poly)hydroxy-(poly)carboxylic acid, and mixtures thereof; in combination with a carbohydrate or a non-carbohydrate carbonyl component; and at least one emulsion polymer. Preferably, the emulsion polymer has a glass transition temperature, Tg, no greater than 70° C. Preferably, the carbohydrate is a monosaccharide or disaccharide. In a preferred embodiment, the aqueous binder composition additionally comprises a Lewis acid catalyst.

Thus, this invention is an aqueous formaldehyde-free binder composition, which, upon curing on a suitable substrate material, provides a binder and a composite material comprising the cured binder, having both flexibility and strength. This invention provides aqueous compositions which may function as aqueous binder compositions.

The present invention provides an aqueous composition comprising, as a percentage by weight of solids: a) from 25% to 87% of one or more carbohydrate chosen from a monosaccharide, a disaccharide, a polysaccharide, a derivative thereof, and a combination thereof; b) at least 8% of one or more amine reactant chosen from a protein, a peptide, an amino acid, an ammonium salt of a polycarboxylic acid, an ammonium salt of a (poly)hydroxy-(poly)carboxylic acid, a derivative thereof, and a combination thereof; and c) from 5% to 50% of one or more emulsion polymer.

In one embodiment, the monosaccharide, disaccharide, polysaccharide, or derivative thereof comprises at least 30% monosaccharide, disaccharide, or derivative thereof, or combination thereof. In another embodiment, the monosaccharide, disaccharide, polysaccharide, or derivative thereof comprises at least 30% dextrose.

In yet another embodiment, the monosaccharide, disaccharide, polysaccharide, or derivative thereof comprises corn syrup comprising at least 30% dextrose.

In a further embodiment, the amine reactant is ammonium citrate.

In a different embodiment, the amine reactant is an ammonium salt of poly(meth)acrylic acid.

In still another embodiment, the aqueous composition further comprises a Lewis acid.

In an alternative embodiment, the emulsion polymer does not comprise polymerized units of a carboxylic acid monomer.

In another alternative embodiment, the emulsion polymer comprises, as polymerized units, one or more multi-ethylenically unsaturated monomer.

In addition, the present invention provides methods of treating substrates with the aqueous binder compositions, optionally followed by heat curing. Although the compositions may find use as binders even without any curing, or after minimal cure, preferably, the compositions are heated to provide a cured binder.

For each composition described herein, there exists an accompanying embodiment in which the aqueous composition is a binder composition and in which the composition is present in a composite material or product. As defined herein, the term "composite material" refers to materials comprising: (a) a substrate material selected from fibers, slivers, chips, particulate matter, films, sheets, and combinations thereof; and (b) the binder composition of the described embodiment.

Thus, in another aspect of the invention, there is provided a composite material comprising: (a) a substrate material selected from fibers, slivers, chips, particulate matter, films, sheets, and combinations thereof; and (b) a cured binder composition derived from an aqueous composition comprising, as a percentage by weight of solids: (i) from 25% to 87% of one or more carbohydrate selected from the group consisting of: a monosaccharide, a disaccharide, a polysaccharide, a derivative thereof, and a combination thereof; (ii) at least 8% of one or more amine reactant selected from the group consisting of: a protein, a peptide, an amino acid, an ammonium salt of a polycarboxylic acid, an ammonium salt of a (poly)hydroxy-(poly)carboxylic acid, a derivative thereof, and a combination thereof; and (iii) from 5% to 50% of one or more emulsion polymer.

In a further aspect of the invention, there is provided an aqueous composition comprising, as a percentage by weight of solids: (a) from 25% to 90% of one or more carbohydrate selected from the group consisting of: a monosaccharide, a disaccharide, a polysaccharide, a derivative thereof, and a combination thereof; (b) at least 8% of one or more amine reactant selected from the group consisting of: a protein, a peptide, an amino acid, an ammonium salt of a polycarboxylic acid, an ammonium salt of a (poly)hydroxy-(poly)carboxylic acid, a derivative thereof, and a combination thereof; and (c) from 2% to 15% of one or more Lewis acid.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures. As used herein, the term "amine reactant" refers to one or more compounds possessing an amino group, including proteins, peptides and amino acids, as well as ammonium salts of a polycarboxylic acid, or ammonium salts of a (poly)hydroxy-(poly)carboxylic acid, which species may be monomeric or polymeric.

As used herein, the term "ammonium" includes, but is not limited to, $^{+}NH_4$, $^{+}NH_3R^1$, $^{+}NH_2R^1R^2$, where $R^1$ and $R^2$ are each independently selected, and where $R^1$ and $R^2$ are selected from alkyl, cycloalkyl, alkenyl, cycloalkenyl, heterocyclyl, aryl, and heteroaryl. That is, the term "ammonium" includes "alkyl ammonium".

As used herein, the term "polycarboxylic acid" may refer, in the alternative, to a dicarboxylic acid, tricarboxylic acid, tetracarboxylic acid, pentacarboxylic acid, and like monomeric polycarboxylic acids, and anhydrides, and combinations thereof, as well as polymeric polycarboxylic acids, and anhydrides, and combinations thereof. The polycarboxylic acid may be substituted with other chemical functional groups.

Unless otherwise indicated, any term containing parentheses refers, alternatively, to the whole term as if no parentheses were present and the term without that contained in the parentheses, and combinations of each alternative. Thus, as used herein, the term "(meth)acrylate" means acrylate, methacrylate, and mixtures thereof and the term "(meth)acrylic" used herein means acrylic, methacrylic, and mixtures thereof.

As used herein, the term "(poly)hydroxy-(poly)carboxylic acid" encompasses, in the alternative, the term "polyhydroxy-polycarboxylic acid", or "monohydroxy-polycarboxylic acid", or "polyhydroxy-monocarboxylic acid", or "monohydroxy-monocarboxylic acid".

As used herein, the term "(poly)saccharide" encompasses, in the alternative, polysaccharide, or the generic term "saccharide" (which latter, following its use in the art, may include a polysaccharide, a monosaccharide, or a disaccharide), or mixtures thereof.

As used herein, the term "reducing sugar" refers to one or more sugars that contain aldehyde groups, or that can isomerize, i.e. tautomerize, to contain aldehyde groups, which groups are reactive with an amino group under Maillard reaction conditions and which groups may be oxidized to afford carboxylic acids.

As used herein, the phrase "aqueous" or "aqueous solvent" includes water and mixtures composed substantially of water and water-miscible solvents.

As used herein, "wt %" or "wt. percent" means weight percent based on solids.

As used herein, the phrase "based on the total weight of binder solids" or "weight percent of the total solids in the binder" refers to weight amounts of any given ingredient in comparison to the total weight amount of all the non-water ingredients in the binder (e.g., carbohydrate(s), amine or ammonium compound(s), Lewis acid salt(s), emulsion copolymer(s), and the like). Binder compositions of this invention can be aqueous or dry (with water optionally added prior to application to a substrate).

As used herein, the term "polymer" includes the term "copolymer", and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. (Co)polymer means homopolymer or copolymer.

As used herein, the phrase "emulsion polymer" refers to a (co)polymer that has been prepared by emulsion polymerization.

As used herein, the phrase "formaldehyde-free composition" refers to compositions substantially free from added formaldehyde, and which do not liberate substantial formaldehyde as a result of drying and/or curing. Preferably, the binder or material that incorporates the binder liberates less than 10 ppm of formaldehyde, more preferably less than 1 ppm of formaldehyde, as a result of drying and/or curing the binder (10 pppm or 1 ppm based on the weight of sample being measured for formaldehyde release).

As used herein, the phrases "$(C_3-C_{12})$-" or "$(C_3-C_6)$-" and the like refer to organic compounds or structural portions of organic compounds containing 3 to 12 carbon atoms and 3 to 6 carbon atoms, respectively.

The singular forms "a," "an," and "the" include plural referents unless the context clearly dictates otherwise. Unless defined otherwise, technical and scientific terms used herein have the same meaning as is commonly understood by one skilled in the art. The endpoints of all ranges directed to the same component or property are inclusive of the endpoint and independently combinable.

As used herein, unless otherwise indicated, the phrase "glass transition temperature" or "Tg" refers to a measured Tg, determined by differential scanning calorimetry (DSC) using a heating rate of 10° C./minute, taking the mid-point in the heat flow versus temperature transition as the Tg value.

Unless otherwise indicated, conditions of temperature and pressure are room temperature and standard pressure, also referred to as "ambient conditions". The compositions may be dried under conditions other than ambient conditions.

As used herein, unless otherwise indicated, the phrase "molecular weight" with respect to a polymer refers to the weight average molecular weight of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

The molecular weight information for a low molecular weight sample (e.g., 10,000) may be determined more accurately by techniques such as mass spectrometry or light scattering techniques as is known in the art. Herein, lower molecular weights, such as polysaccharides, are determined by gel permeation chromatography with laser light scattering.

The inventive aqueous binder composition comprises one or more amine component, which is either a protein, a peptide, an amino acid, or an ammonium salt of a polycarboxylic reactant in combination with a carbohydrate or a non-carbohydrate carbonyl component, and further comprising at least one emulsion polymer. The reaction between the amine component and the carbohydrate or non-carbohydrate carbonyl component may proceed in a manner analogous to that of a Maillard reaction, and may produce melanoidins. Melanoidins are high molecular weight, furan ring and nitrogen-containing polymers that vary in structure depending on the reactants and conditions of preparation. The cured binders of the invention may therefore comprise such melanoidin species. In the alternative, melanoidin species may be prepared separately and added to the aqueous binder compositions. Likewise, similar Maillard reactions may be performed separately, and any or all of the reaction products thereof may be added to the aqueous binder compositions.

The aqueous binder composition of the present invention comprises at least one carbohydrate or a non-carbohydrate carbonyl component. The term carbohydrate refers to polyhydroxylated compounds many of which contain aldehydic or ketonic groups or yield such groups on hydrolysis. Simple carbohydrates are referred to as sugars or saccharides. Sugars refer to monosaccharides, disaccharides, or polysaccharides, depending on the number of sugar units linked together. Monosaccharides usually consist of five or six carbon atoms and are referred to as pentoses and hexoses, repectively. If the monosaccharide contains an aldehyde it is referred to as an aldose; if it contains a ketone, it is referred to as a ketose. The aqueous binder composition may comprise one or more monosaccharide, or disaccharide, or polysaccharide, or degradation product thereof. The carbohydrate component may be a monosaccharide in its aldose or ketose form, including a triose, a tetrose, a pentose, a hexose, or a heptose; or a disaccharide; or a polysaccharide; or combinations thereof. Glyceraldehyde and dihydroxyacetone are considered to be aldotriose and ketotriose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Other natural or synthetic stereoisomers or optical isomers of such carbohydrates may also be useful as the carbohydrate component of the aqueous binder composition. Similarly, polysaccharides (including disaccharides) may find use in the aqueous binder compositions, for example, sucrose, lactose, maltose, starch, and cellulose. A number of powdered or granulated sugars or sugar syrups, including corn syrup, high fructose corn syrup, and the like, may act as sources of the carbohydrate component of the aqueous binder composition.

The carbohydrate component or non-carbohydrate carbonyl component of the aqueous binder composition optionally may be substituted, for example with hydroxy, halo, alkyl, alkoxy, or other substituent groups.

Higher molecular weight polysaccharides that may be useful in the binder of this invention include those selected from the group consisting of starch, cellulose, gums such as guar and xanthan, alginates, chitosan, pectin, gellan and modifications or derivatives thereof which are provided by etherification, esterification, acid hydrolysis, dextrinization, oxidation or enzyme treatment. Such polysaccharides can be derived from natural products, including plant, animal and microbial sources. Polysaccharide starches include maize or corn, waxy maize, high amylose maize, potato, tapioca and wheat starches. Other starches include varieties of rice, waxy rice, pea, sago, oat, barley, rye, amaranth, sweet potato, and hybrid starches available from conventional plant breeding, e.g., hybrid high amylose starches having amylose content of 40% or more, such as high amylose corn starch. Genetically engineered starches, such as high amylose potato and potato amylopectin starches, may also be useful.

The polysaccharides may be modified or derivatized, such as by etherification, esterification, acid hydrolysis, dextrinization, oxidation or enzyme treatment (e.g., with alpha-amylase, beta-amylase, pullulanase, isoamylase, or glucoamylase), or bio-engineered.

The polysaccharide used in this inventive binder composition may have a weight average molecular weight of greater than 10,000, or greater than 100,000 (e.g. as high as 1,000,000 or even as high as 10,000,000). However, lower molecular weight (poly)saccharides are preferred; the (poly)saccharide preferably has a weight average molecular weight of less than 10,000, or, even, less than 1,000. In one embodiment, the (poly)saccharide preferably has a molecular weight of less than 500. Weight average molecular weight of the (poly) saccharide is measured using gel permeation chromatography with laser light scattering.

Thus, most preferably, the (poly)saccharide is a monosaccharide or disaccharide. In one embodiment, the (poly)saccharide is a reducing sugar. Dextrose has been found to be particularly suitable. In one exemplary embodiment, a high dextrose content syrup (greater than 30% dextrose) is used as the carbohydrate component. In such syrups, the higher the dextrose content, the better.; syrups with 97%, or greater, dextrose content are commercially available, for example ADM 97/71 corn syrup, from Archer Daniels Midland Company (Decatur, Ill., USA).

Additionally, non-carbohydrate carbonyl compounds may undergo similar reaction types with the amine component in producing melanoidins. Thus, alternatively, the aqueous binder composition may comprise a non-carbohydrate carbonyl component. Examples of non-carbohydrate carbonyl reactants include various aldehydes, such as pyruvaldehyde and furfural, as well as compounds such as ascorbic acid and quinone, which may be capable of producing melanoidin compounds by reaction with the amine reactant. The carbohydrate or a non-carbohydrate carbonyl component of the aqueous binder composition may be one or more of those described herein, or a combination thereof.

Preferably, the carbohydrate or non-carbohydrate carbonyl component should be sufficiently non-volatile to maximize its ability to remain in the binder composition during the heating or curing thereof.

The carbohydrate or non-carbohydrate carbonyl component may comprise from 25%, or from 50%, or from 60%, up to 87%, or up to 85%, or up to 70%, by weight of solids as a percent of the total solids in the binder; preferably the carbohydrate or non-carbohydrate carbonyl component comprises from 70%, or from 75%, or from 80%, up to 90%, or up to 85%, or up to 80% by weight of solids as a percent of the total solids in the binder; and most preferably from 70-80%, or 75-85%.

The aqueous binder composition comprises at least one amine reactant. The amine reactant may be one or more protein, or peptide, or amino acid, or, urea, or polyacrylamide, or ammonium salt of a polycarboxylic acid, or ammonium salt of a (poly)hydroxy-(poly)carboxylic acid, or combination thereof. The polycarboxylic acid or (poly)hydroxy-(poly)carboxylic acid species may be monomeric or polymeric. Moreover, such species may be substituted with other chemical functional groups. For example, the (poly) hydroxy-(poly)carboxylic acid species may be, for example, an unsaturated aliphatic (poly)hydroxy-(poly)carboxylic acid, a saturated aliphatic (poly)hydroxy-(poly)carboxylic acid, an aromatic (poly)hydroxy-(poly)carboxylic acid, an unsaturated cyclic (poly)hydroxy-(poly)carboxylic acid, a saturated cyclic (poly)hydroxy-(poly)carboxylic acid, anhydrides thereof, or mixture thereof. Further, such (poly)hydroxy-(poly)carboxylic acid species may be optionally substituted, such as with halo, alkyl, alkoxy, and the like. The ammonium salt of a polycarboxylic acid, or ammonium salt of a (poly)hydroxy-(poly)carboxylic acid may be mono-basic, or dibasic, or polybasic depending on the acid. Moreover, the molar equivalents of ammonium ion may or may not be equal to the molar equivalents of acid salt groups present on the polycarboxylic acid.

The term polycarboxylic acid may refer, in the alternative, to a dicarboxylic acid, tricarboxylic acid, tetracarboxylic acid, pentacarboxylic acid, and like monomeric polycarboxylic acids, and anhydrides, and combinations thereof, as well as polymeric polycarboxylic acids, and anhydrides, and combinations thereof.

Examples of monomeric polycarboxylic acid include itaconic acid, citric acid, lactic acid, aconitic acid, adipic acid, azelaic acid, maleic acid, malic acid, succinic acid, and the like, and anhydrides, and combinations thereof.

Examples of polymeric polycarboxylic acid include water soluble polyacrylic acid, poly(methacrylic acid), and poly (maleic acid). Alternatively, the polymeric polycarboxylic acid may be prepared from unsaturated anhydrides, or mixtures of unsaturated anhydrides, such as maleic anhydride, (meth)acrylic anhydride, and the like. Alternatively, the polymeric polycarboxylic acid may comprise a copolymer of one or more of the aforementioned unsaturated carboxylic acids or anhydrides and one or more vinyl compounds including, but not necessarily limited to styrene, alpha-methylstyrene, vinyl actate, vinyl alkyl ethers, (meth)acrylonitrile, and esters of (meth)acrylic acid, such as methyl (meth)acrylate, butyl (meth)acrylate and ethylhexyl (meth)acrylate. Water soluble polyacids have previously found utility as binders, for example with polyol components, and optionally with catalysts. Aquaset™-529 (available from Rohm and Haas Company, Philadelphia, PS, USA) is one such example, comprising a polyacrylic acid, glycerol and sodium hypophosphite as a catalyst. Similarly, non-carbohydrate polyols (compounds comprising two or more hydroxyl groups) may be included in the compositions of the current invention, for example, glycerol, diethanolamine, triethanolamine, beta-hydroxyalkylamides, and the like, as is known in the art. Preferably, any non-carbohydrate polyol component should be sufficiently non-volatile to maximize its ability to remain in the binder composition during the heating or curing thereof. Hydrolyzed or partially hydrolyzed polyvinyl acetate polymers may serve as the non-carbohydrate polyol. Likewise, phosphorus containing accelerators, such as sodium hypophosphite, potassium polyphosphate, and the like, as is known in the art, may be included in the compositions of the current invention.

Mixed ammonium salts of the (poly)acid are also contemplated, for example in the event a polymeric polycarboxylic acid is partially neutralized with sodium hydroxide, and then further neutralized with ammonium hydroxide. As discussed earlier, the term "ammonium" includes "alkyl ammonium". Preferably, the aqueous binder composition is at an alkaline pH (a pH of 7 or higher), which minimizes corrosion of any mixing or storage or processing equipment. In one embodiment, the pH of the aqueous binder composition is less than or equal to 10.

Preferably, the polycarboxylic acid ammonium salt or amine component should be sufficiently non-volatile to maximize its ability to remain in the binder composition during the heating or curing thereof.

Preferably, the amine reactant is selected from an ammonium salt of a monomeric or polymeric polycarboxylic acid, and an ammonium salt of a (poly)hydroxy-(poly)carboxylic acid. Preferred amine reactants include ammonium salts of poly(meth)acrylic acid or ammonium salts of citric acid.

The ammonium salt may be present at a level of 8-75 weight percent based on solids as a percentage of the total solids in the binder. Preferably, the ammonium salt is present at a level of from 10%, or from 15%, up to a level of 50%, or up to 30%; and, most preferably, is at a level of from 10% up to 15% or up to 20% based on solids as a percentage of the total solids in the binder.

As indicated earlier, for each embodiment for which the binder composition comprises an amine reactant component and a carbohydrate component, there exists also an alternative embodiment for which the carbohydrate component is replaced with, or combined with, a non-carbohydrate carbonyl reactant.

Optionally, the aqueous binder composition of the invention may comprise a Lewis acid. Lewis acids useful in the present invention include, but are not limited to, titanates and zirconates such as organic titanates and zirconates sold by DuPont under the Trade name Tyzor, for example, but not limited to, water soluble Tyzors such as Tyzor™ LA, Tyzor™ 131, Tyzor™ 217, and Tyzor™ 218; dibutyltindilaurate, other organo-tin salts, inorganic tin salts such as tin(IV)chloride and corresponding sulfates or nitrates; $Al_2(SO_4)_3.xH_2O$, $MgCl_2.6H_2O$, $AlK(SO_4)_2.10H_2O$, $Al_2Zn(SO_4)_4$, and Lewis acids having the formula $MX_n$ wherein M is a metal, X is a halogen atom or an inorganic radical or anion (including polyatomic radicals or anions, such as sulfate, nitrate, and the like), and n is an integer of from 1 to 5, such as $BX_3$, $AlX_3$, $FeX_3$, $GaX_3$, $SbX_3$, $SnX_4$, $AsX_5$, $ZnX_2$, and $HgX_2$. A combination of Lewis acid catalysts may also be used. Preferably, the Lewis acid is water soluble (having a solubility in water of greater than 1 gram per liter). Preferably, the Lewis acid catalyst is selected from the group consisting of: sulfates, nitrates, halides, citrates, lactates, and gluconates of zinc, aluminum, zirconium, iron, copper, magnesium, tin, titanium and boron; and their mixed metal salts; organo-tin compounds or salts; and titanates or zirconates of alcohols or (poly)carboxylic acids.

The Lewis acid may be present at a level of 2-15 weight percent based on solids as a percentage of the total solids in the binder. Preferably, the Lewis acid is present at a level of from 3%, or from 5%, up to a level of 15%, or up to 12%, or up to 6%; and, most preferably, is at a level of from 5% up to 10% based on solids as a percentage of the total solids in the binder.

The aqueous binder composition additionally comprises an aqueous emulsion copolymer, which latter provides greater flexibility and elasticity to both the binder and the cured thermoset product.

Ethylenically unsaturated co-monomers useful in the emulsion copolymer include (meth)acrylic ester monomers such as methyl (meth)acrylate, ethyl (meth)acrylate, butyl (meth)acrylate, 2-ethylhexyl (meth)acrylate, decyl (meth) acrylate, isodecyl (meth)acrylate, hydroxyethyl (meth)acrylate, and hydroxypropyl (meth)acrylate; (meth)acrylamide or substituted (meth)acrylamides; styrene or substituted styrenes; butadiene; vinyl acetate or other vinyl esters; acrylonitrile or methacrylonitrile; and the like. Styrene-acrylic latexes or all-acrylic latexes have been found to be well-suited to the performance requirements of the targeted end products.

In one embodiment, the latex emulsion copolymer of this invention comprises one or more copolymerized multi-ethylenically unsaturated monomers such as, for example, allyl methacrylate (ALMA), allyl acrylate, diallyl phthalate, 1,4-butylene glycol dimethacrylate, 1,2-ethylene glycol dimethacrylate, 1,6-hexanediol diacrylate, butadiene, trimethylolpropane triacrylate (TMPTA) and divinyl benzene. Of these, ALMA, divinylbenzene (DVB), diallyl phthalate, 1,4-butylene glycol dimethacrylate, and 1,6-hexanediol diacrylate are preferred. ALMA is the most preferred. The multi-ethylenically unsaturated monomer can be effectively employed at levels as low as 0.1%, by weight based on the weight of the copolymer, preferably from 0.1 to 10%, or 0.1 to 5%, more preferably from 0.1 to 4%, or 0.2 to 4%, and most preferably from 0.1 to 2%, or 0.2 to 2%, or 0.25 to 2%, or 1.0 to 2%, by weight based on the weight of the copolymer.

The emulsion copolymer used in the binder of this embodiment of the invention may include, as copolymerized units, a carboxy monomer bearing a carboxylic acid group, anhydride group, or salt thereof or hydroxyl-group, such as (meth) acrylic acid and hydroxyethyl(meth)acrylate. For example, the emulsion copolymer may be a high acid polymer, a low acid polymer, or it may not comprise any acid monomer, depending on the desired property balance of the resulting binder. For example, a high acid polymer may comprise from 5% to 40%, or 5% to 30%, or 10% to 20%, by weight based on the weight of the emulsion copolymer solids, of the carboxy monomer bearing a carboxylic acid group, anhydride group, or salt thereof, such as (meth)acrylic acid. Preferably, the emulsion polymer is an insoluble polymer dispersion in water. A low acid polymer may comprise from 1% to 5%, or 1% to 3%, by weight based on the weight of the emulsion copolymer solids, of the carboxy monomer bearing a carboxylic acid group, anhydride group, or salt thereof. Ethylenically unsaturated carboxylic acid monomers include, for example, methacrylic acid, acrylic acid, crotonic acid, fumaric acid, maleic acid, 2-methyl maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. If a carboxylic acid monomer is present, acrylic acid is preferred. Preferably, the emulsion copolymer does not comprise a carboxy monomer bearing a carboxylic acid group, anhydride group, or salt thereof.

Chain transfer agents such as mercaptans, polymercaptans, and halogen compounds can be used in the polymerization mixture in order to moderate the molecular weight of the emulsion copolymer. Generally, from 0% to 10% by weight, based on the weight of the emulsion copolymer, of $C_4$-$C_{20}$ alkyl mercaptans, mercaptopropionic acid, or esters of mercaptopropionic acid, can be used. Preferably, the emulsion copolymer used in this invention has a Tg of between 0-35° C., preferably 5-20° C., for non-treated substrates having an inherent elongation of greater than 5%, such as spunbond polyester; and between 35-70° C. for non-treated substrates having an inherent elongation of less than 5%, such as glass mat, as measured by differential scanning calorimetry per ASTM 3418/82, midpoint temperature; cell calibration using an indium reference for temperature and enthalpy.

The emulsion copolymer used in this invention has weight average molecular weight of from 5,000 to 2,000,000, preferably from 20,000 to 1,000,000. For applications requiring high performance at elevated temperatures, the emulsion copolymer most preferably has a weight average molecular weight of 100,000 to 1,000,000, however, for some room temperature applications, the molecular weight is most preferably from 30,000 to 600,000. Preferably, the emulsion polymer has a glass transition temperature, Tg, no greater than 70° C., more preferably, no greater than 50° C., and most preferably, no greater than 20° C.

The emulsion polymer may be present in the composition in an amount of from 5%, or from 10%, up to 80%, or up to 50%, or up to 30% by weight of solids as a percent of the total weight of solids in the binder; preferably from 5% to 25%, or, most preferably, from 5% to 20%.

In a preferred embodiment suitable for binders that require some flexibility, the aqueous binder composition comprises approximately 70-80% by weight, based on the total weight of binder solids, of a saccharide such as dextrose, approximately 10-20% of an ammonium salt of a monomeric polycarboxylic acid, such as ammonium citrate, and approximately 5-15% by weight, based on the total weight of binder solids, of an acrylic or styrene acrylic emulsion polymer.

In a particularly preferred embodiment, the composition further comprises a Lewis acid catalyst, such as zinc sulfate, in an amount of approximately 5-10 wt. %, based on the total weight of solids of the other components of the composition.

The binder of this invention can contain, in addition, conventional treatment components such as, for example, emulsifiers; pigments; fillers or extenders, such as clays and talcs; anti-migration aids; curing agents; coalescents; surfactants, particularly nonionic surfactants; spreading agents; mineral oil dust suppressing agents; biocides; plasticizers; organosilanes; anti-foaming agents such as dimethicones and emulsified poly(dimethacones), silicone oils and ethoxylated nonionics; corrosion inhibitors, such as thioureas, oxalates, and chromates; colorants; antistatic agents; lubricants; waxes; anti-oxidants; coupling agents such as silanes, particularly Silquest™ A-187 (manufactured by GE Silicones-OSi Specialties, located in Wilton Conn.); other amino silanes; epoxy silanes, vinyl silanes and hydrophobic silanes. Other additives may include polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

Additionally, this invention includes methods for treating substrates comprising: Forming the wet, uncured web of fibers, and preferably transferred to a moving screen running through a binder application station where the aqueous binder of the invention is applied to the mat. The binder can be applied to the structure by any suitable means including, for example, air or airless spraying, padding, saturating, roll coating, curtain coating, beater deposition, coagulation or dip and squeeze application, and the resultant saturated wet bindered web laying on a supporting wire or screen is run over one or more vacuum boxes to remove enough binder to achieve the desired binder content in the mat. The binder level in the inventive mats can range from 5 or from 10 to 35 wt. percent of the finished dry mat, preferably 12 to 30 wt. percent. The binder composition is curable by the application of heat, i.e., the binder composition is a thermosetting composition.

The binders of this invention are useful to bind non-woven webs, among other things. "Non-woven web(s)" refers to any article or sheet-like form made from natural and/or synthetic fibers wherein the fibers are aligned in a random or semi-random order (i.e., not deliberately ordered). One skilled in the art understands that formation of some order occurs during the web forming process (primarily in the machine direction); however, this is completely different from the ordering obtained from traditional weaving or knitting processes. Suitable fibers for use in forming the web include, but are not limited to, fiberglass, cellulose, modified cellulose (cellulose acetate), cotton, polyesters, rayon, polyacrylonitrile (PAN), polylactic acid (PLA), polycaprolactone (PCL), polyolefins and bi-component fiber comprising two or more fiber-forming polymers such as polypropylene and polyethylene terephthalate and the like. Included in the definition of non-woven webs suitable for use with this invention are porous films prepared by the action of chemical or mechanical processing (e.g., apertured films). Also included as useful for the purpose of this invention are paper and paper products. The present invention will find utility with any weight of non-woven web and will depend greatly on the requirements of the particular application. Manufacturing processes for making non-woven webs are well known in the art. These include, for example, wet-laid, air-laid (dry laid), spunbond, spunlace, meltblown and needle punch. Particularly suitable webs will have a base weight (i.e., the weight of the web before any coating or treatments are applied) of less than 100 grams per square meter (gsm). In another aspect the webs will have a base weight of less than 20 gsm.

The composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

Preferably, the binder compositions are formaldehyde-free. To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers, coupling agents, anti-foaming agents, dust suppressing agents, fillers and the like, which are themselves free from formaldehyde, do not generate formaldehyde during the polymerization process, and do not generate or emit formaldehyde during the treatment of heat-resistant nonwovens.

In drying (if applied in aqueous form) and curing the curable compositions, the duration, and temperature of heating, will affect the rate of drying, ease of processing or handling, and property development of the treated substrate. Suitable heat treatment at 100° C. or more, and up to 400° C., may be maintained for from 3 seconds to 15 minutes. Preferably, heat treatment temperatures range 150° C. or higher; such preferred heat treatment temperatures may range up to 225° C., or, more preferably, up to 200° C. or, up to 150° C. Where the substrate contains wood, temperatures of 100° C. to 220° C., are preferred.

Drying and curing can be done in two or more distinct steps, if desired. For example, the curable composition can be first heated at temperatures and for times sufficient to at least partially dry, but not to fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates include, for example, heat-sensitive substrates, such as wood, including, solid wood, wood particles, fibers, chips, flour, pulp, and flakes; paper and cardboard; textiles, including cotton, linen, wool, and synthetic textiles from polyester, rayon, or nylon, and superabsorbent fibers; vegetable fibers, such as jute, sisal, flax, cotton and animal fibers; as well as heat resistant substrates, such as metal; plastic; fibers, such as glass and mineral fibers, aramid fibers, ceramic fibers, metal fibers, carbon fibers, polyimide fibers, and woven and non-woven fabrics made therefrom. Heat-resistant non-wovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Non-woven fabrics are composed of fibers which can be consolidated in whole or in part by mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Some non-woven fabrics are used at temperatures higher than ambient temperature such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a curable composition should substantially retain the properties contributed by the cured aqueous composition such as, for example, tensile strength. In addition, the cured composition should not substantially detract from essential non-woven fabric characteristics, as would be the case, for example, if the cured composition were too rigid or brittle or became sticky under processing conditions.

EXAMPLES

These examples serve to illustrate the invention, outlining specific binder compositions of this invention and ones that compare to such compositions. The scope of the invention is not intended to be limited by these examples.

The preparations and test procedures are carried out at room temperature and standard pressure unless otherwise indicated.

Reagents:

Dextrose monohydrate, CAS# 5996-10-1 (Dex)

Citric acid, CAS# 77-92-9 (CA)

Ammonium hydroxide 28-30%, CAS# 1336-21-6, $NH_3.H_2O$

Zinc sulfate heptahydrate, CAS# 7446-20-0, $ZnSO_4.7H_2O$

Example 1

Synthesis of Emulsion Polymers

Synthesis of Emulsion Copolymer A

After heating 340 g deionized water and 5.0 g sodium lauryl sulfate (28% Solids) to 90° C., 2.4% of a monomer mixture of 199 g water, 7.5 g sodium lauryl sulfate (28%), 349 g methyl methacrylate, 100 g butyl acrylate, 2.28 g allyl methacrylate and 4.55 g acrylamide is added followed by 5.2 g ammonium persulfate solution (27.3% solids). This combination is held at 88° C. for 5 minutes. Then, the remaining monomer mix is added gradually along with 19.7 g of a 1.6% aqueous ammonium persulfate solution. The reaction mixture is cooled to 70° C. and 2.0 g of an iron sulfate solution (0.26% solids) is added. While at 70° C., 13 g of a 13.4% aqueous t-butyl hydroperoxide solution and 26 g of a 3.8% aqueous solution of hydroxymethane sulfonic acid monosodium salt are gradually added, and then the mixture is further cooled to 40° C. and aqueous ammonia is added to adjust pH to 8.5. The product is filtered through 100 and 325 mesh screens.

Synthesis of Emulsion Copolymers B and C

A 5-liter round-bottom flask equipped with a paddle stirrer, thermocouple, nitrogen inlet, and reflux condenser was charged with 876.4 grams of deionized water, 24.2 grams of sodium hypophosphite monohydrate, 28.5 grams of a sodium lauryl ether sulfate surfactant solution (30%), 3.1 grams of sodium hydroxide, and 0.058 grams of an inhibitor. The mixture was heated to 88° C.

For the synthesis of polymer B, a monomer emulsion was prepared using 459.7 grams of deionized water, 89.2 grams of a sodium lauryl ether sulfate surfactant solution (30%), 553.9 grams of butyl acrylate, 969.7 grams of styrene, and 268.9 grams of acrylic acid. A 97.0 gram aliquot of this monomer emulsion was added to the reaction flask, with stirring, followed by a solution of 7.4 grams of ammonium persulfate dissolved in 33.3 grams of deionized water. After an exotherm and while maintaining a reaction temperature of 85° C., the monomer emulsion and a separate solution of 7.4 grams of ammonium persulfate in 156.9 grams of deionized water were gradually added over a total time of 130 minutes. After these additions were complete a solution of 42.6 grams of sodium hydroxide dissolved in 397.4 grams deionized water was added. A solution of 0.022 grams of ferrous sulfate heptahydrate in 4.8 grams deionized water and a solution of 0.022 grams of ethylene diamine tetraacetate, tetra sodium salt, dissolved in 4.8 grams of deionized water was added to the reaction mixture. A solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After a 15 minute hold, a solution of 7.9 grams of aqueous tert-butylhydroperoxide (70%) diluted with 31.2 grams deionized water and a solution of 5.3 grams of sodium bisulfite dissolved in 62.8 grams of deionized water were gradually added to the reaction mixture. After a 15 minute hold, 47.6 grams of deionized water was added, and the reaction mixture was cooled to room temperature. When the reaction mixture was cool below 40° C., a biocide was added and the latex was filtered through a 100 mesh sieve.

Emulsion polymer C followed this same procedure, but with the monomer emulsion prepared as shown in Table 1. The resulting latexes had a solids content of roughly 46.0%. The emulsion copolymers B and C had Tg as shown in Table 1.

TABLE 1

Monomer Emulsion Recipes for Emulsion Polymers B and C (weights in grams), and Copolymer Tg

| | Emulsion Polymer B | Emulsion Polymer C |
|---|---|---|
| Deionized water | 459.7 | 456.8 |
| Sodium lauryl ether sulfate surfactant (30%) | 89.2 | 88.7 |
| Butyl acrylate | 553.9 | 1072.3 |
| Styrene | 969.7 | 637.6 |
| Acrylic acid | 268.9 | 53.4 |
| Allyl methacrylate | 0.0 | 17.8 |
| Copolymer Tg (° C.) | 55 | 10 |

Amino resins, such as urea formaldehyde (UF) resins, are well known and widely commercially available. They are formed, for example, from the reaction of urea and formaldehyde to form compounds containing methylol groups, which subsequently under the application of heat, with or without catalysts, react further, or condense, or cure to form polymers. The methylol groups in the resin are known to react with active hydrogen groups such as other methylol groups to form ether or methylene groups thereby forming polymeric structures. Rhoplex™ GL-618 and Rhoplex™ HA-8 (both from Rohm and Haas Company, Philadelphia, USA) are commercially available acrylic emulsion polymers that contain methylolacrylamide to provide sites for crosslinking to such amino resin binders.

Example 2

Preparation of Treated Glass Microfiber Filter Paper and Testing Thereof

Aqueous curable formulations were prepared as shown in Table 2. Glass microfiber filter paper sheets (20.3×25.4 cm, Cat No. 1820 866, Whatman International Ltd., Maidstone, England) were weighed, dip-coated by hand through a trough, placed between two pieces of cardboard, and run through a roll padder at a speed and pressure such that the add-on was approximately 15 weight % binder. The add-on of the coated sheets was determined as the cured binder weight as a percentage of filter paper weight. Each sheet was dried in a Mathis oven set to 90° C. for 90 seconds and cured in another Mathis oven at specified times and temperature.

The cured sheets were cut into fourteen 1 inch (cross machine direction) by 4 inch (machine direction) strips and tested for tensile strength in the machine direction in a Thwing-Albert EJA Vantage Universal tensile tester. The fixture gap was 2 inches and the pull rate was 2 inches/minute and the sensitivity was 10 lb. Both the dry and hot-wet tensile data reported is the average peak force measured during testing of seven test strips. For hot-wet tensile strength testing, strips were tested immediately after a 30 minute soak in water at 85° C.

Example 3

Early Strength Development of Saccharide Binders: Effect of Lewis Acid

For each sample, comparative examples Comp. A1-A2 and inventive example Ex. A1, the formulation components were simply admixed in aqueous solution using a benchtop stirrer.

The binder was applied and cured on glass microfiber filter paper sheets as described in Example 2 (above), and then tested for hot wet tensile properties (Table 2, below). The binder add-on was approximately 15%. Binders based on sugars often have acceptable dry tensile strength properties, however, the soluble nature of the sugars invariably compromises the hot wet tensile properties of these systems, which properties are considered important.

Aqueous compositions comprising a carbohydrate and an ammonium salt of a polycarboxylic acid have recently been proposed as thermosetting or curable binders. However, such systems have been found to be lacking with respect to early cure and strength development. Table 2, below, presents the formulation components, in grams, for some representative aqueous binder compositions of the invention and shows the effect of a Lewis acid in such systems.

TABLE 2

Formulation Components and Hot Wet Tensile (lb.) after curing at 190° C.[1]

| Sample | Dex (g.) | CA (g.) | $NH_3 \bullet H_20$ (g.) | Lewis Acid (g.) ($ZnSO_4$) | Hot Wet Tensile (lbf) (30 sec. cure) | Hot Wet Tensile (lbf) (60 sec. cure) |
|---|---|---|---|---|---|---|
| Comp. A1 | 20.00 | — | — | — | 0 | 0 |
| Comp. A2 | 15.00 | 2.73 | 2.42 | — | 0 | 1.5 |
| Ex. A1 | 15.00 | 2.73 | 2.42 | 3.15 | 2.0 | 5.2 |

[1]On glass microfilterpaper; binder add-on is approximately 15%.

The data in Table 2 shows that the addition of a Lewis acid, zinc sulfate, accelerates and greatly enhances the early cure and strength development of aqueous curable binder compositions comprising a carbohydrate and an ammonium salt of a polycarboxylic acid (as shown, for example, by comparison of Ex. A1 and Comp. A2).

Example 4

Mechanical Properties of Binder Compositions on Glass Mat

Glass Mat Preparation Procedure

To prepare the glass mats used in the samples in Table 2, glass fiber non-woven handsheets are prepared with Johns Manville 137 Standard, 3.2 cm (1¼ inch) length, sized glass chop using approximately 7.6 grams of glass fiber per sheet (0.82 kg per 9.3 square meters; 1.8 pounds per 100 square feet). The glass fiber is dispersed in water using SUPER-FLOC™ A-1883 RS (Cytec Industries Incorporated, West Paterson, N.J., USA), an anionic polyacrylamide water-in-oil emulsion, and RHODAMEEN™ VP-532 SPB (Rhodia Chemical Company, Cranbury, N.J., USA), an ethoxylated fatty amine cationic dispersing agent. Handsheets are formed in a Williams (Williams Apparatus Company, Watertown, N.Y., USA) handsheet mold. The wet sheets are transferred to a vacuum station and de-watered. In each case, the aqueous binder composition is applied to a de-watered sheet and the excess is vacuumed off. The sheets are dried/cured in a forced air oven for 2½ minutes at 200° C. The binder amount on the samples is 17% LOI (loss on ignition).

Determination of LOI (Loss On Ignition)

A 6.4 cm by 7.6 cm (2.5 inch by 3 inch) piece of dried/cured fiberglass mat was cut. The sample was weighed and then placed in a muffle furnace at 650° C. for 2 minutes.

The sample was removed and then reweighed. % LOI was calculated using the equation: % LOI=(wt. before burning−wt. after burning)×100/(wt. before burning).

Room Temperature Testing of Tensile Strength and Elongation

An Instron 4201 tensile tester equipped with a 1 kN load cell and an oven chamber encasing the jaws with temperature range of −100 to 400° F. (−73° C. to 204° C.) capability was used for room temperature (RT) tensile strength, hot-wet tensile strength, high temperature (hot-dry) tensile strength, and room temperature elongation.

For RT tensile strength and RT elongation, a cured sheet was cut into 1½"×10" strips. Strips were tested by placing them in the jaws of the tensile tester and pulled apart at a crosshead speed of 8 inches/minute with a 6" gap. The maximum RT tensile strength is measured, and expressed in pounds force (lbf). Elongation (strain) is measured at maximum RT tensile strength, and expressed as %. Both the dry and hot-wet tensile data reported is the average peak force measured during testing of seven test strips and expressed in pounds force (lbf). Strips were tested either "as is" (dry tensile) or immediately after a 30 minute soak in water at 85° C.

Hot-Dry Tensile Strength

A cured sheet is cut into 2"×12" strips. The oven chamber of the tensile tester is pre-heated to 375° F. (190° C.) prior to testing. Once pre-heated, the strips are placed in the jaws and the oven chamber closed and equilibrated back to 375° F. The samples are then pulled apart at a crosshead speed of 8 inches/minute with a 8" gap. Hot Tensile Strength is measured at 20% elongation (strain), and expressed in pounds force (lbf).

Elmendorf Tear Strength Testing

Elmendorf tear strength is determined on cut samples of dried/cured handsheet which are 6.4 cm by 7.6 cm (2.5 inches by 3 inches). A single ply sample is placed in a Thwing-Albert Tear Tester with a 1600 g tear arm. The sample is notched with a 1.9 cm (0.75 inch) cut and the arm is released. The tear strength is recorded in grams (grams force).

Polymer Modified Saccharide Binder Compositions

The formulations for the samples presented in Table 3 were prepared as described earlier; Comp. C2 uses the addition of 175.0 grams, g., (159.1 g. dry weight) dextrose, 381.6 g. water, 28.9 g. citric acid, and 25.5 g. (7.7 g. dry weight) ammonium hydroxide. For the polymer modified binder compositions, a latex emulsion polymer was added, with stirring in an amount equal to 10% or 20% by weight of polymer solids based on the weight of total solids of the other components in the composition. The binder was applied and cured on glass mats and then tested for mechanical properties (Tables 3, below). The binder add-on was approximately 17% on the glass mats.

TABLE 3

Mechanical properties of saccharide thermoset compositions comprising an emulsion polymer[1]

| ID | Formulation | Room Temp. Tensile Strength (lbf) | Hot-Wet Tensile Strength (lbf) | Hot-Dry Tensile Strength (lbf) | Tear Strength (grams-f) |
|---|---|---|---|---|---|
| C1 | UF Resin[2] | 32.9 | 21.2 | 35.5 | 498 |
| C2 | Dex + $(NH_4)$Citrate | 30.7 | 19.1 | 24.8 | 333 |
| C3 | Dex + 20% Polymer A | 8.4 | 0.0 | 8.7 | 724 |
| C4 | Dex + 20% Polymer B | 5.5 | 0.0 | 0.2 | 614 |
| Ex. 1 | Dex + $(NH_4)$Citrate + 10% Polymer A | 37.3 | 19.3 | 30.1 | 789 |

TABLE 3-continued

Mechanical properties of saccharide thermoset compositions comprising an emulsion polymer[1]

| ID | Formulation | Room Temp. Tensile Strength (lbf) | Hot-Wet Tensile Strength (lbf) | Hot-Dry Tensile Strength (lbf) | Tear Strength (grams-f) |
|---|---|---|---|---|---|
| Ex. 2 | Dex + $(NH_4)$Citrate + 20% Polymer A | 44.3 | 25.3 | 24.1 | 666 |
| Ex. 3 | Dex + $(NH_4)$Citrate + 20% Polymer B | 24.9 | 24.5 | 22.5 | 710 |

[1]On glass mat; binder add-on approximately 17%.

[2]The UF resin is SU-100, from Hexion Specialty Chemicals, Columbus, Ohio, USA (a commercial urea-formaldehyde binder for this application).

The data in Table 3 show that addition of 10% or 20% emulsion polymer can favorably impact the balance of properties in these saccharide binder systems, although in some cases there may be a trade-off in performance attributes.

Example 5

Mechanical Properties of Binder Compositions on Spunbond Polyester

Polyester Spunbond Mat Preparation:

More flexible systems are tested on polyester spunbond mat. Commercial polyester spunbond mat (non-treated) is cut into 15"×12" sheets. Sheets are dip coated in test binder formulation at 11% bath solids (by weight). Soaked sheets are padded at 40 psi and then immediately cured at 200° C. for 3 minutes. Binder add-on is about 20% by weight.

Room Temperature Testing: Tensile Strength, Elongation for Polyester Spunbond Mat Room temperature testing of tensile strength and elongation for polyester spunbond mat was performed in the same manner as described above for glass mat.

TABLE 4

Effect of addition of emulsion polymer on saccharide thermoset properties[1]

| Sample | Latex Modifier[2] | Dextrose + $(NH_4)$Citrate[3] RT Tensile (lbf) | Dextrose + $(NH_4)$Citrate[3] Elongation (%) |
|---|---|---|---|
| Comp. B1 | None | 80.5 | 40 |
| Ex. B1 | Polymer C | 84.7 | 43 |
| Ex. B2 | GL-618 | 86.2 | 42 |
| Ex. B3 | HA-8 | 90.2 | 54 |

[1]On spunbond polyester mat (flexible substrate); binder add-on is approximately 20%.

[2]Latex modifier is added at a level of 10% by weight of solids as a percentage of total solids of other binder components.

[3]Formulation ratios are as described for the samples in Table 3.

The data in Table 4 show that addition of 10% emulsion polymer (polymer solids as a percentage of other composition component solids) can show improvement in both room temperature tensile strength and % elongation properties. These inventive compositions thus provide an inexpensive, formaldehyde-free, thermoset binder that retains both flexibility and strength after cure. The inventive compositions derive primarily from renewable resources as opposed to petroleum feedstocks.

We claim:

1. An aqueous composition comprising, as a percentage by weight of solids:

a. from 25% to 87% of one or more carbohydrate chosen from a monosaccharide, a disaccharide, a polysaccharide, a derivative thereof, and a combination thereof;

b. at least 8% of one or more amine reactant chosen from ammonium citrate, an ammonium salt of poly(meth)acrylic acid, a derivative thereof, and a combination thereof; and c. from 5% to 50% of one or more emulsion polymer.

2. The aqueous composition of claim 1 wherein the monosaccharide, disaccharide, polysaccharide, or derivative thereof comprises at least 30% monosaccharide, disaccharide, or derivatives thereof, or combinations thereof.

3. The aqueous composition of claim 1 wherein the monosaccharide, disaccharide, polysaccharide, or derivative thereof comprises at least 30% dextrose.

4. An aqueous composition comprising, as a percentage by weight of solids:

a. from 25% to 87% of one or more carbohydrate chosen from a monosaccharide, a disaccharide, a polysaccharide, a derivative thereof, and a combination thereof;

b. at least 8% of one or more amine reactant chosen from a protein, a peptide, an amino acid, an ammonium salt of a polycarboxylic acid, an ammonium salt of a (poly)hydroxy-(poly)carboxylic acid, a derivative thereof, and a combination thereof; and c. from 5% to 50% of one or more emulsion polymer, wherein the composition further comprises a Lewis acid.

5. The aqueous composition of claim 1 wherein the emulsion polymer does not comprise polymerized units of a carboxylic acid monomer.

6. The aqueous composition of claim 1 wherein the emulsion polymer comprises, as polymerized units, one or more multi-ethylenically unsaturated monomer.

7. A composite material comprising:

(a) a substrate material selected from fibers, slivers, chips, particulate matter, films, sheets, and combinations thereof; and (b) a cured binder composition derived from an aqueous composition comprising, as a percentage by weight of solids:

i. from 25% to 87% of one or more carbohydrate chosen from a monosaccharide, a disaccharide, a polysaccharide, a derivative thereof, and a combination thereof;

ii. at least 8% of one or more amine reactant chosen from ammonium citrate, an ammonium salt of poly(meth) acrylic acid, a derivative thereof, and a combination thereof; and iii. from 5% to 50% of one or more emulsion polymer.

8. An aqueous composition comprising, as a percentage by weight of solids a. from 25% to 90% of one or more carbohydrate chosen from a monosaccharide, a disaccharide, a polysaccharide, a derivative thereof, and a combination thereof;

b. at least 8% of one or more amine reactant chosen from a protein, a peptide, an amino acid, an ammonium salt of a polycarboxylic acid, an ammonium salt of a (poly) hydroxy-(poly)carboxylic acid, a derivative thereof, and a combination thereof; and c. from 2% to 15% of one or more Lewis acid.

9. The composition as claimed in claim 8, wherein the monosaccharide, disaccharide, polysaccharide, or derivative thereof comprises at least 30% dextrose.

10. The composition as claimed in claim 8, wherein the amine reactant is chosen from ammonium citrate and an ammonium salt of poly(meth)acrylic acid.

* * * * *